United States Patent [19]

Miranker et al.

[11] Patent Number: 4,520,456
[45] Date of Patent: May 28, 1985

[54] DUAL RECIPROCATING PIPELINED SORTER

[75] Inventors: Glen S. Miranker, San Francisco, Calif.; Chak-Kuen Wong, Mt. Kisco, N.Y.

[73] Assignee: International Business Machines Corporation, Armonk, N.Y.

[21] Appl. No.: 467,975

[22] Filed: Feb. 18, 1983

[51] Int. Cl.[3] .............................................. G06F 7/06
[52] U.S. Cl. .................................................... 364/900
[58] Field of Search ... 364/200 MS File, 900 MS File

[56] References Cited

U.S. PATENT DOCUMENTS

| | | | |
|---|---|---|---|
| 3,611,316 | 10/1971 | Woodrum | 364/300 |
| 3,997,880 | 12/1976 | Chen et al. | 364/200 |
| 4,090,249 | 5/1978 | Chen et al. | 364/900 |
| 4,110,837 | 8/1978 | Chen | 364/900 |

OTHER PUBLICATIONS

A. W. Maholick, et al, Sorting Network, IBM Technical Disclosure Bulletin, vol. 12, No. 4, Sep. 1979, pp. 620-621.

*Primary Examiner*—Harvey E. Springborn
*Attorney, Agent, or Firm*—Carl C. Kling

[57] ABSTRACT

The invention is a bidirectional transposition exchange sorter for performing two overlapped sort operations overlapped in time with input/output operations so as to consume zero time. The sorter operates on the basis of a stack of cells, each of which contains two item storage locations and a comparator. The cells are arranged in a sorter stack configuration with a shift register monitor for each cell and an extra shift register position at the top of the sorter stack and also at the bottom. The monitor carries an indication of the current transfer mode for the cell. Each sort is carried out as two semi-sorts, input and output, which semi-sorts are time overlapped with the input and output operations typical of sort operations in computers. A portion of the sort operation takes place during an input step, so as to result in a partial reconfiguration of an unordered sequence at the end of the input semi-sort. Thereafter, a second portion of the sort operation takes place; the items exit in fully ordered sequence. After the sorter stack has been loaded with a first semi-sort of an unordered sequence, for example at the top end of the sorter stack, the second semi-sort of the unordered sequence at the top end may be overlapped with a first semi-sort of another unordered group of items being presented at the bottom end of the sorter stack.

8 Claims, 24 Drawing Figures

⊗ - COMPARATOR

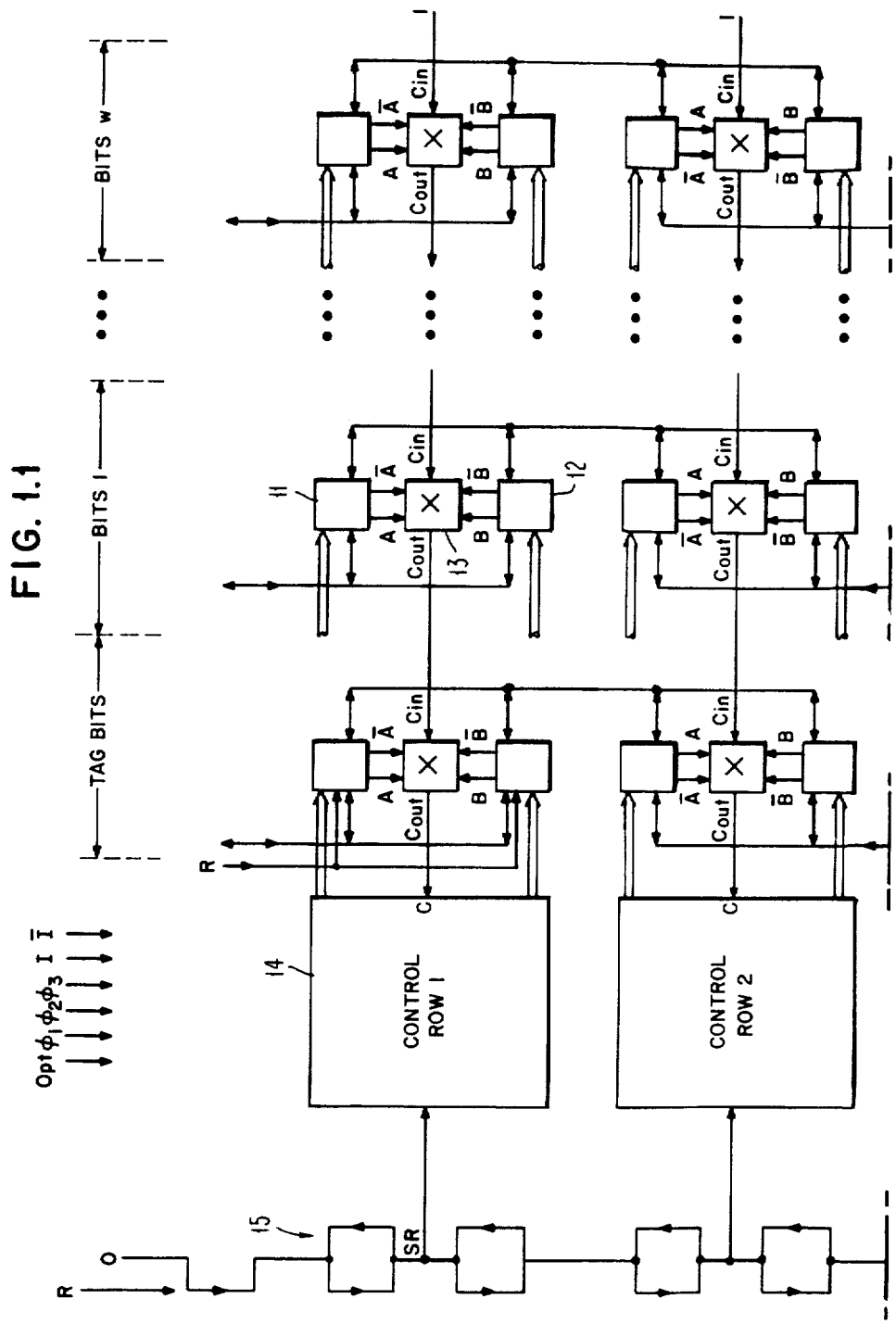
FIG. 1.1

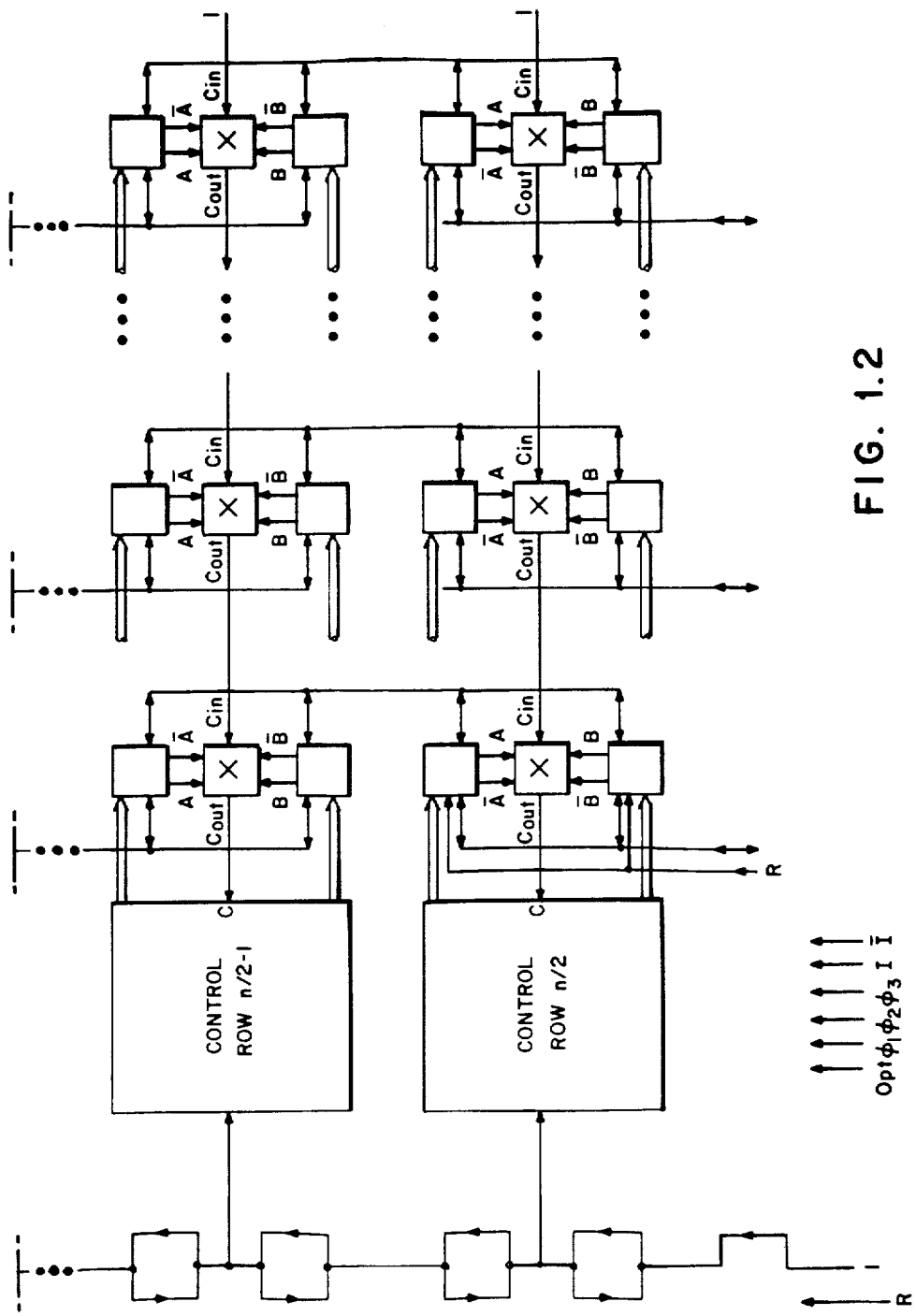
FIG. 1.2

FIG. 2.1
INPUT STAGE
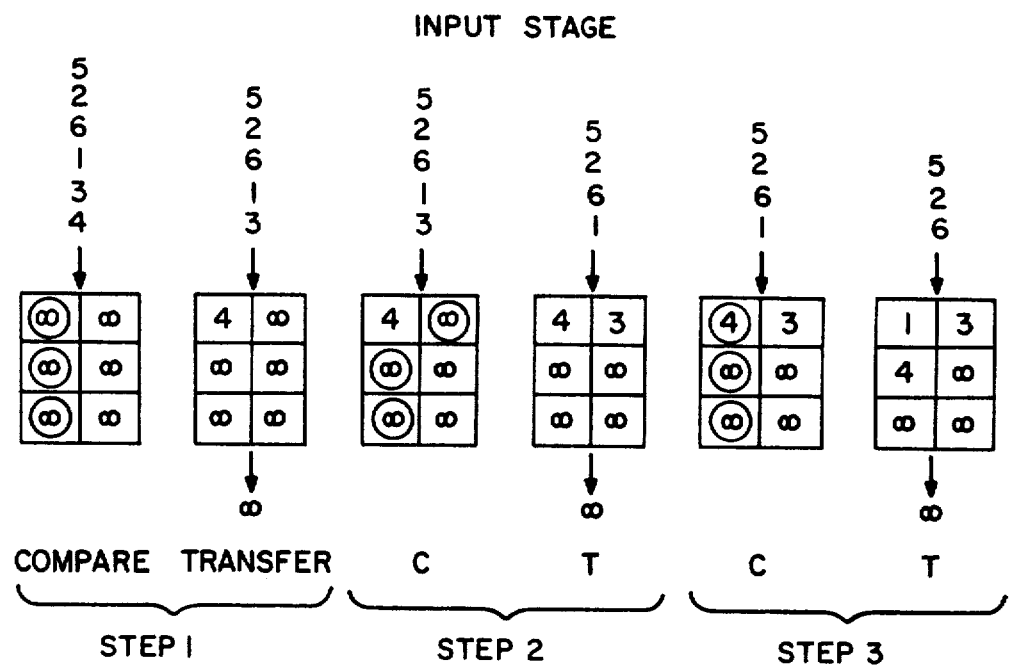
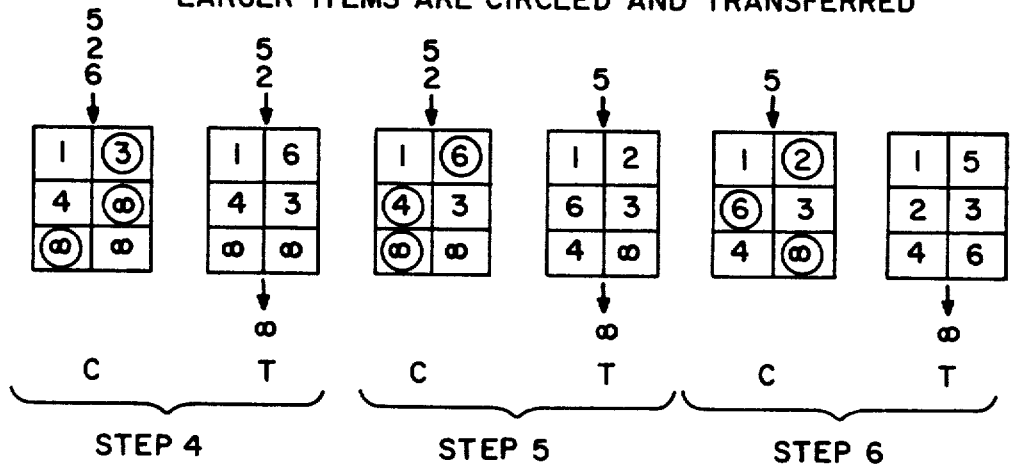

FIG. 2.2
OUTPUT STAGE
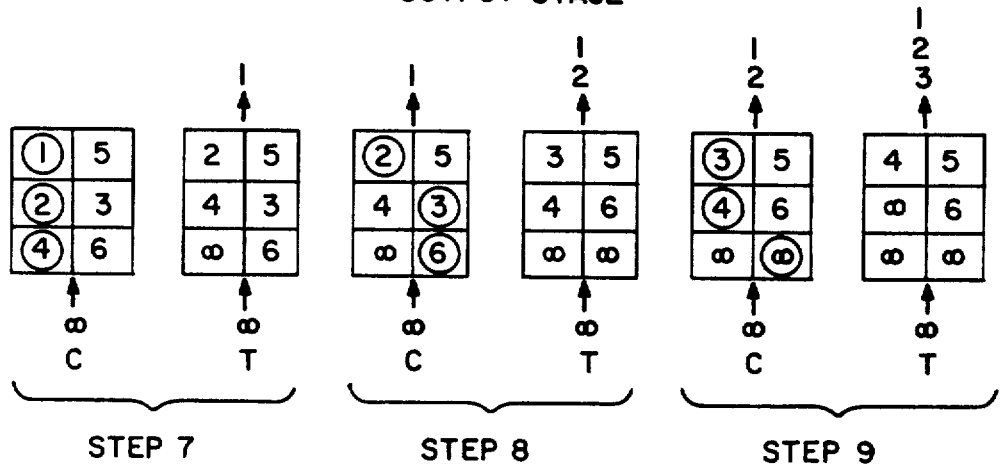
STEP 7   STEP 8   STEP 9
SMALLER ITEMS ARE CIRCLED AND TRANSFERRED
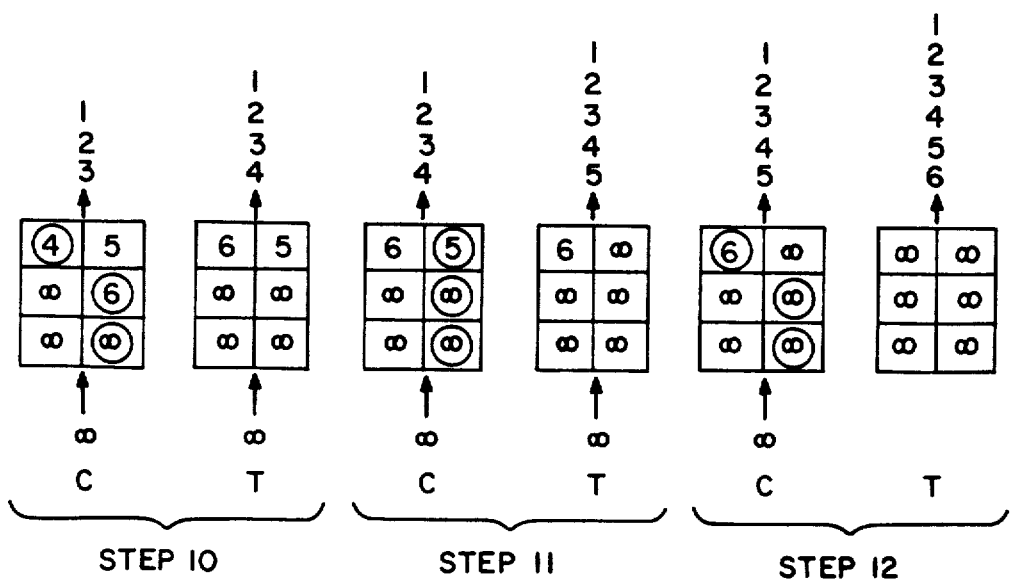
STEP 10   STEP 11   STEP 12

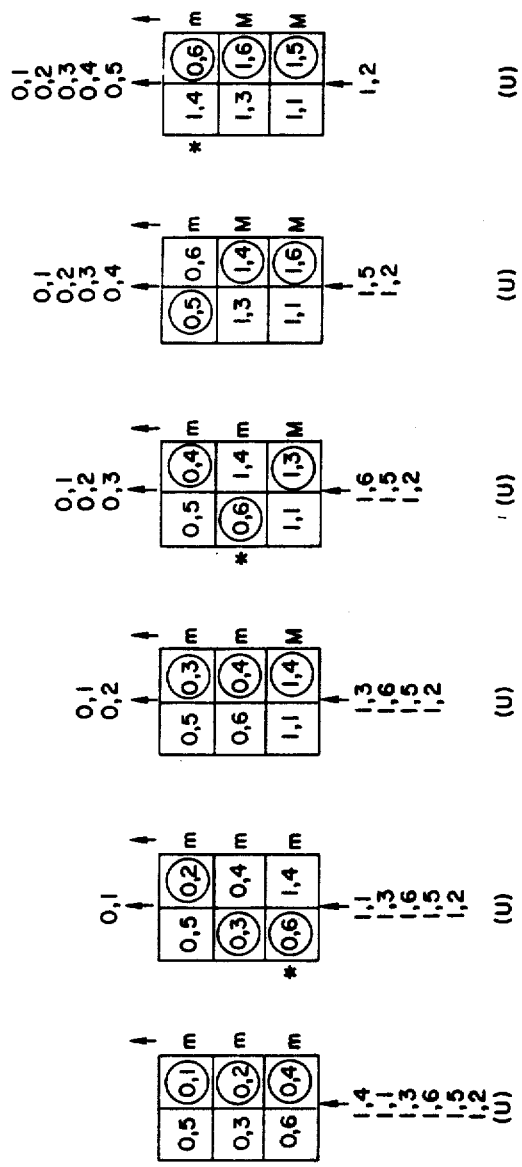
FIG. 3.1

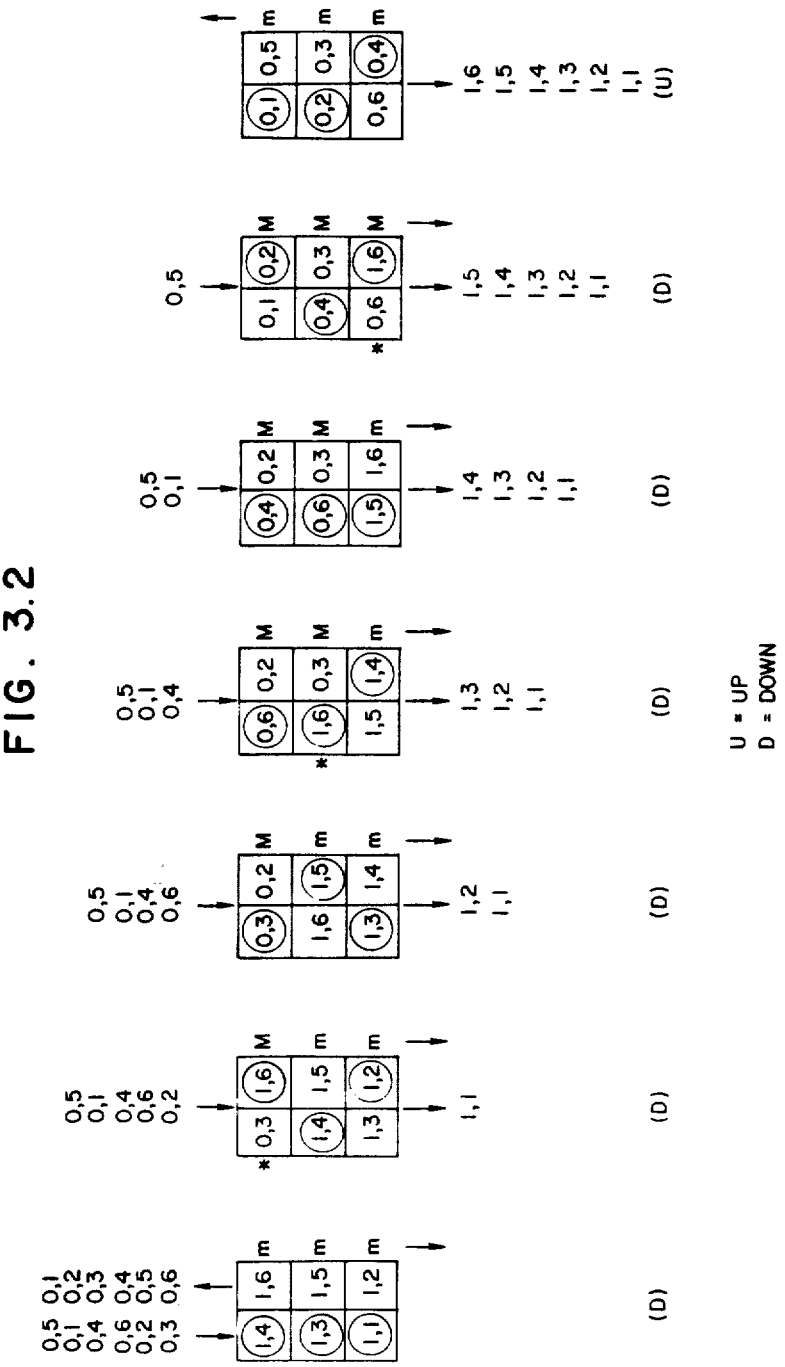
FIG. 3.2
U = UP
D = DOWN

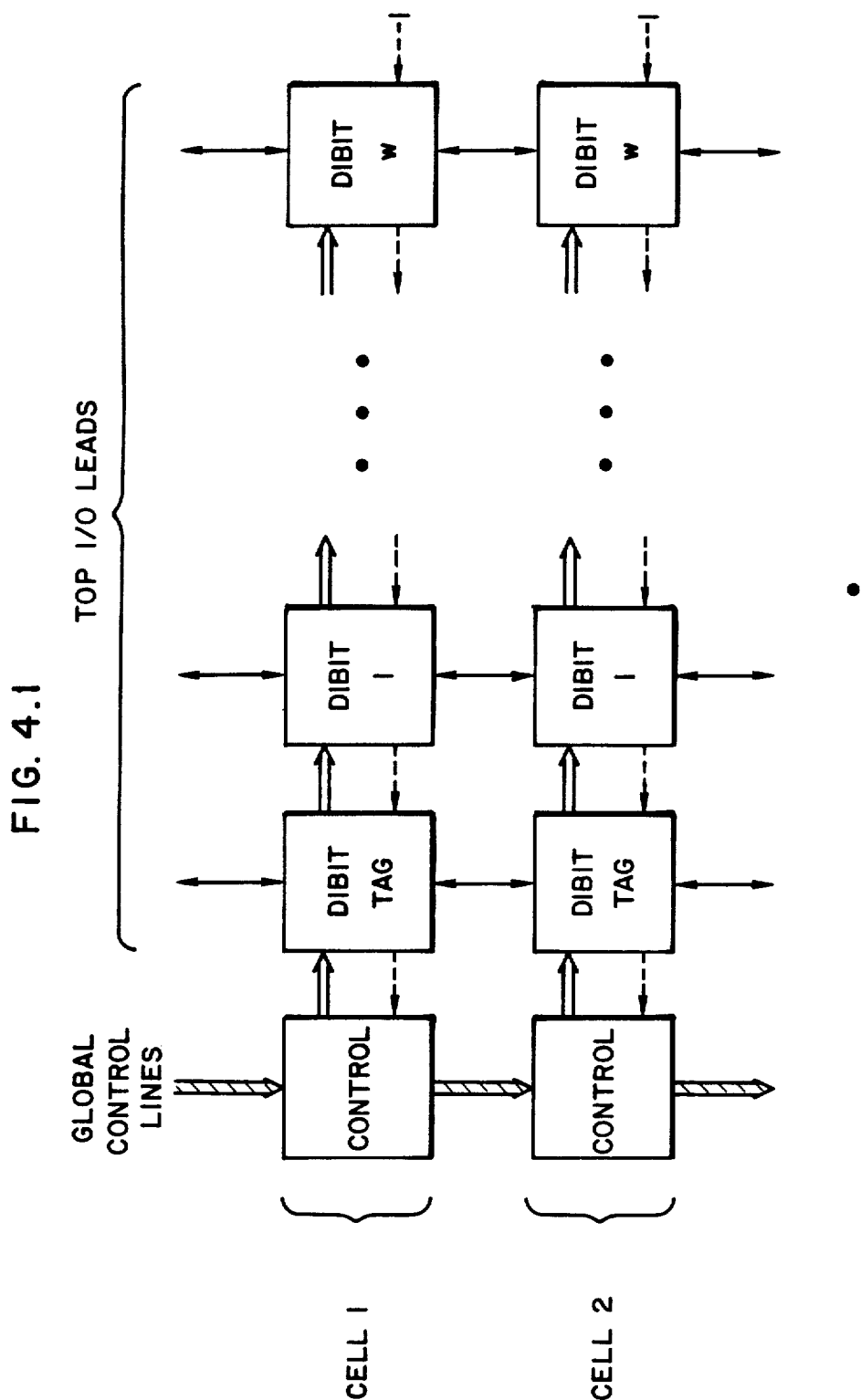
FIG. 4.1

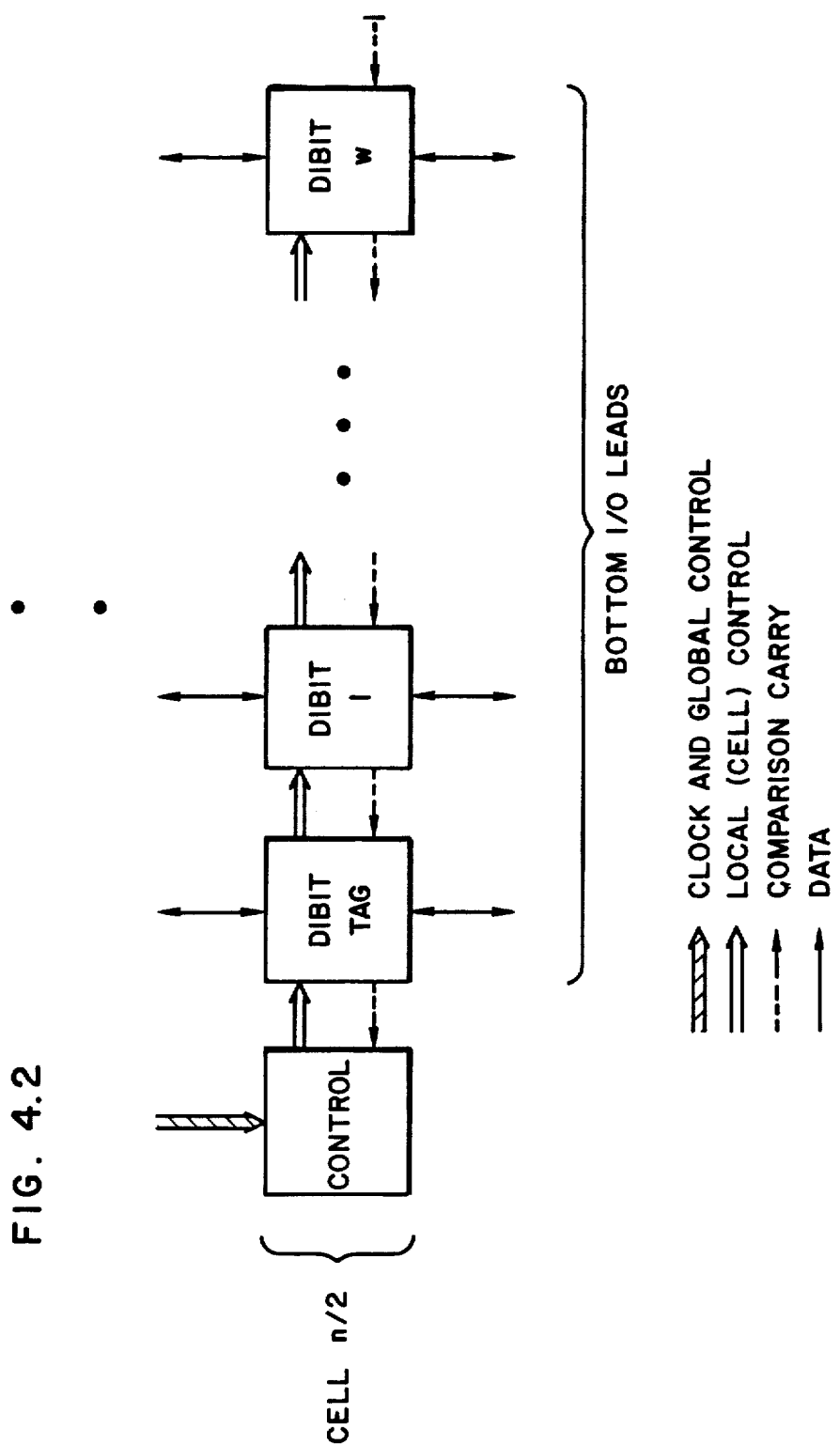
FIG. 4.2

OUTPUT STAGE: A > B
INPUT STAGE: A < B

⟶ DIRECTION OF DATA FLOW DURING INPUT
→ DIRECTION OF DATA FLOW DURING OUTPUT

FIG. 8

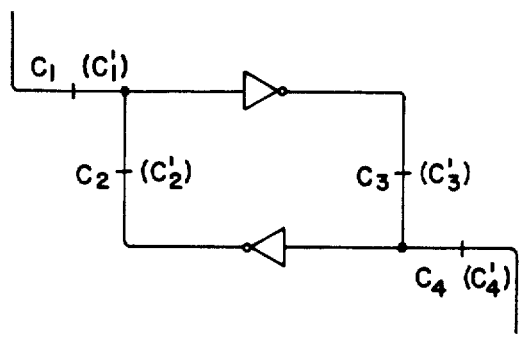

DOWN:     BIT A

$C_1 = \phi_2 \, C$     $C = 1$
$C_2 = \phi_2 \, \bar{C}$     $(A \geq B)$
$C_3 = 1$
$C_4 = \phi_1 \, C$ $\phi_1 = 1$ 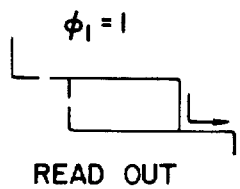 READ OUT $\phi_2 = 1$ 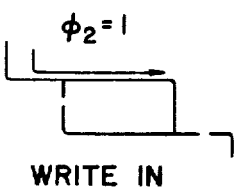 WRITE IN

BIT B

$C_1' = \phi_2 \, \bar{C}$     $C = 1$
$C_2' = \phi_2 \, C$     $(A \geq B)$
$C_3' = 1$
$C_4' = \phi_1 \, \bar{C}$ $\phi_1 = 1$ 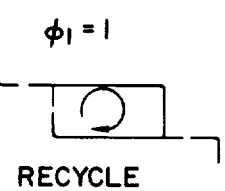 RECYCLE $\phi_2 = 1$ 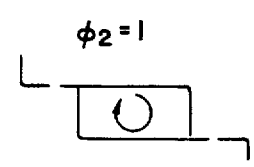 RECYCLE

UP:     BIT A

$C_1 = \phi_1 \, \bar{C}$     $C = 1$
$C_2 = 1$     $(A \geq B)$
$C_3 = \phi_2 \, C$
$C_4 = \phi_2 \, \bar{C}$ $\phi_1 = 1$ 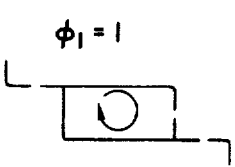 RECYCLE $\phi_2 = 1$ 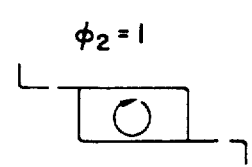 RECYCLE

BIT B

$C_1' = \phi_1 \, C$     $C = 1$
$C_2' = 1$     $(A \geq B)$
$C_3' = \phi_2 \, \bar{C}$
$C_4' = \phi_2 \, C$ $\phi_1 = 1$ 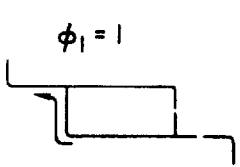 READ OUT $\phi_2 = 1$ 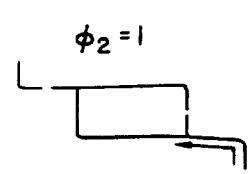 WRITE IN Pre. = Precharging the comparison carry line.

$C_{out}$ = Compute $C_{out}$ in the comparators for bit pairs, obtaining C.

Control = C is fed into the control circuit of $C_1$, $C_2$, $C_3$, $C_4$, and $C'_1$, $C'_2$, $C'_3$, $C'_4$.

R. = Read the transfer bit out to the next cell (down or up).

W. = Write in the transfer bit from the other next cell (up or down).

Cir. = The stay bit is recycled in the cell.

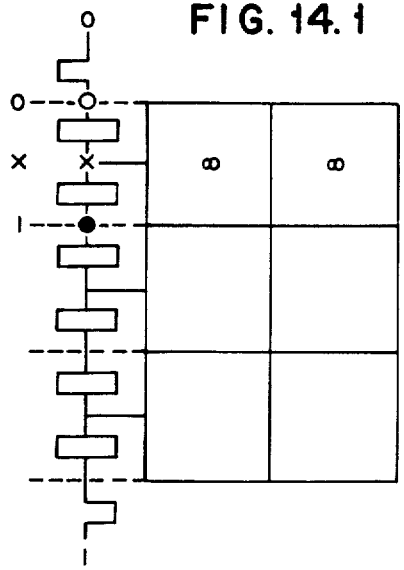
FIG. 14.1
INITIALIZATION 1 FOR
ASCENDING SORT (t=0_)
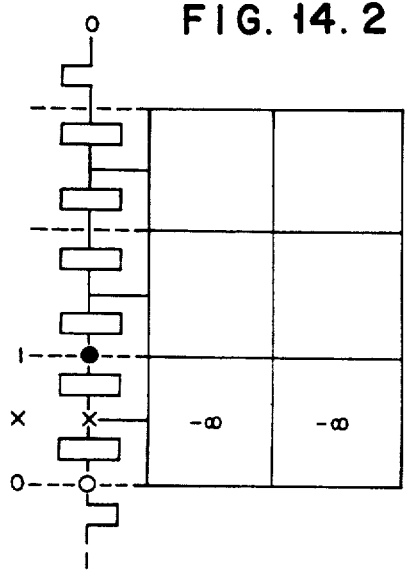
FIG. 14.2
INITIALIZATION 2 FOR
ASCENDING SORT (t=0_)
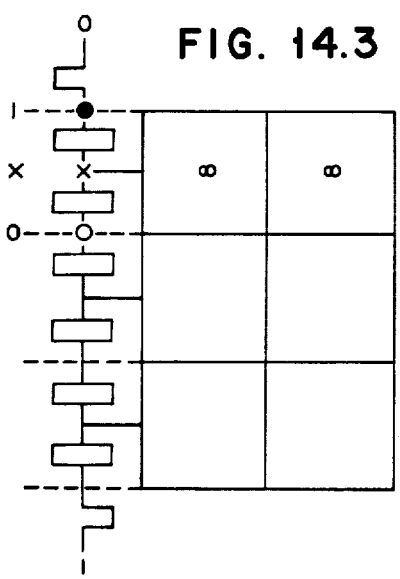
FIG. 14.3
INITIALIZATION 2 FOR
DESCENDING SORT (t=0_)
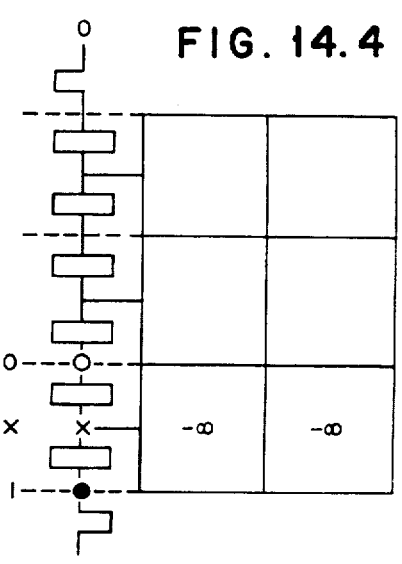
FIG. 14.4
INITIALIZATION 1 FOR
DESCENDING SORT (t=0_)

FIG. 14.5
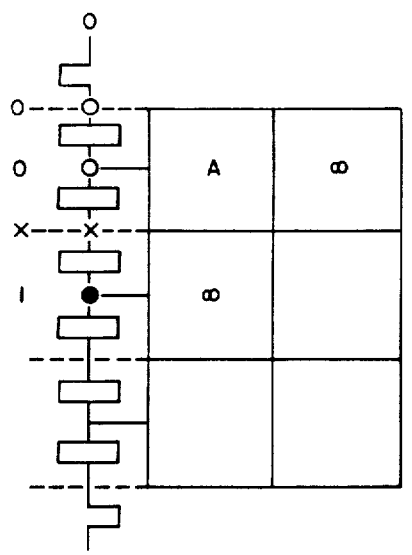
SORTING FROM CONFIGURATION
(a) AT $t = 1_+$. (1 CLOCK
CYCLE AFTERWARDS)
O = ZERO, X = DON'T CARE, ● = 1, A = ITEM FROM SEQUENCE

DUAL RECIPROCATING PIPELINED SORTER

BACKGROUND OF THE INVENTION

1. Field of the Invention

This invention relates to sorting mechanism in a computer, and more particularly relates to a dual reciprocating pipelined sorter which overlaps two sorting operations with each other and with input/output required operations so as to require a zero time increment for the two sorting operations.

2. Description of the Prior Art

Sorting is one of the most important operations in data processing. It is estimated that in data processing centers, over 25 percent of central processing unit (CPU) time is devoted to sorting. Many sequential and parallel sorting algorithms, and various sorting structures implementing these algorithms, have been proposed, studied and built.

U.S. Pat. No. 4,110,837, Chen, APPARATUS FOR THE SORTING OF RECORDS OVERLAPPED WITH LOADING AND UNLOADING OF RECORDS INTO A STORAGE APPARATUS, August 1978, shows a computer sorting technique in which an unordered group of items enter into a sorter stack and trickle down in a semi-sort. When all the items have been entered into the sorter stack the second semi-sort is accomplished as the items trickle up for exit out of the sorter stack in fully sorted sequence. These operations take place during the same time that input and output operations may be taking place. There is no discernible sorting time, the sorting being completely overlapped by the loading and unloading of information records. Chen does not show any technique for carrying out a sorting operation of a second unordered group of items overlapped with the sorting operation of the group of items which he is sorting.

Other sorting techniques and variations are included in the following U.S. patents:

U.S. Pat. No. 3,997,880, Chen et al, APPARATUS AND MACHINE IMPLEMENTABLE METHOD FOR THE DYNAMIC REARRANGEMENT OF PLURAL BIT EQUAL-LENGTH RECORDS, December, 1976. Chen et al shows an apparatus for performing efficient transposition exchange sorts among equal length records taking advantage of the flow steering property of linkable circulating storage loops to minimize average access time by positioning information closer to the output port.

U.S. Pat. No. 4,090,249, Chen et al, APPARATUS FOR SORTING RECORDS IN OVERLAP RELATION WITH RECORD LOADING AND EXTRACTION, May 1978. Chen et al shows a record exchange sorter with comparison circuits to control exchange of records being advanced along a linear array from the input to the output.

The literature includes a great number of articles discussing various techniques for sorting. For example, A. W. Maholick and R. E. Snyder, SORTING NETWORK, IBM Technical Disclosure Bulletin, Vol. 12, #4, September 1969, p. 620, describes an interchange sorter which sorts by comparing and interchanging data words. Repetition of this cycle results in the shifting or non-shifting of the data words so that the words are stored in order of magnitude with the highest term in the exit register.

The prior art does not disclose a sort mechanism in which more than one unordered group of items is undergoing processing in the sorter stack at the same time.

SUMMARY OF THE INVENTION

An object of the invention is to speed up computing operations which include sorting by overlapping a plurality of sort operations simultaneously with input/output operations.

The advantage of the invention is that two separate sorting operations may be overlapped in time, without requiring any dedication of real time to the sorting operation itself, because the sorting operations may take place simultaneously with required input/output operations.

The invention is an improved sorter which has inherent dual reciprocating characteristics as well as the capability to overlap its related input and output operation. Two unordered groups of items may be in various stages of the sort operation at the same time that normal input or output operations are taking place—effectively using zero time for the sort operations themselves.

The sorter operates on the basis of a stack of n/2 cells, each cell of which contains two item storage locations, comparator, and input/output gates capable of interconnection with adjacent similar cells.

The sorting of two independent groups is carried out simultaneously, each in two major semi-sort steps, which steps are also overlapped with the input and output operations typical of sort instructions in computers. The input and output steps are required anyway. A portion of the sorting operation takes place during the input step, so as to result in an input semi-sort sequence. At a subsequent time, when the output step is performed, the semi-sorted sequence is subjected to the output semi-sort so as to result in fully sorted output. Once the sorter is loaded for the first time, input can be taking place from one end of the stack simultaneously to output taking place at the opposite end. During the time that the first semi-sorted sequence is being read out at the top of the sorter stack fully sorted, the second unordered group of items may be entered into the stack from the bottom, accomplishing a semi-sort sequence for the second group of items. Each item entered into a cell of the sorter stack from the top is chaperoned by a "0" tag bit to indicate that the cell has been filled from the top; each item entered into a cell of the sorter stack from the bottom is chaperoned by a "1" tag bit.

The input semi-sort operates to cause selected items to trickle down toward the opposite end of the sorter stack if their match to the sort criterion is farther than that of the other item in the cell; the output semi-sort operates to cause selected items to trickle up if their match is closer than that of the other item in the cell. As a result of the down semi-sort and the up semi-sort, the complete sort is accomplished. Complementary semi-sort activities can take place simultaneously at opposite ends of the sorter stack; output of a first sorted sequence takes place simultaneously with input of a subsequent group of items undergoing the input semi-sort.

The sorting time may be completely overlapped with the input/output time. The sorter has complete parallel operations and processes data in a pipelined fashion. It can sort in both ascending and descending order and can overlap the sorting time of two consecutive input sequences. Because of the regularity of its structure, it is suitable for very large scale integration (VLSI) implementation.

The sorter comprises a linear array of n/2 cells (assume n is even), each of which can store two items of the sequence to be sorted. The initial sequence is entered into the sorter stack one item at each step. After the entry of the last item, the data flow direction is reversed and the semi-sorted sequence then exits, also serially, from the sorter stack. Each step is executed synchronously and simultaneously by all the cells and has the following two phases:

(1) Compare: the two items within each cell are compared.
(2) Transfer: subject to the result of the comparison, desired sorting order (ascending or descending) and the sorting state (entry or exit), either one of the two items in each cell is transferred to the neighbor cell and is replaced by one item from the other neighbor cell.

The dual reciprocating sorter not only processes the items of a given unordered group of items in a pipelined fashion, but also sorts different sequences in a pipelined way, i.e., while one sequence is being output fully sorted, a new unordered group of items can be entered at the same time from the other end of the sorter stack. This way, the I/O time of the group of items completely absorbs the sorting time needed by another group of items.

BRIEF DESCRIPTION OF THE DRAWINGS

FIGS. 1.1 and 1.2 in composite, form a system block diagram of the sorting mechanism.

FIGS. 2.1 and 2.2 in composite illustrate an example of the sorting of a sequence in ascending order.

FIGS. 3.1 and 3.2 in composite illustrate an example of sorting with added tag bits.

FIGS. 4.1 and 4.2 in composite show overall topological layout.

FIG. 8 shows gatings for comparison $A \geq B$.

FIG. 14.1-14.5 illustrates the sorting operation.

DESCRIPTION OF A PREFERRED EMBODIMENT

Figure 1:
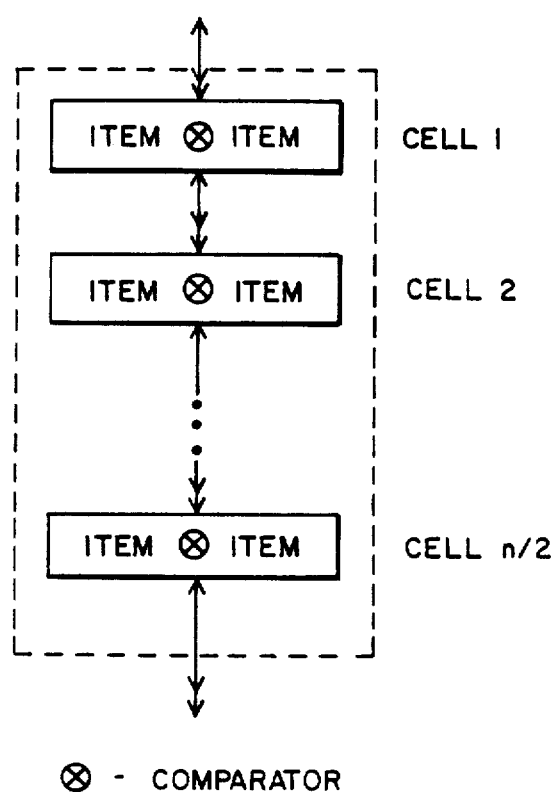
FIG. 1 is a block diagram of the Dual Reciprocating Pipelined Sorter, showing sorting cells 1,2 . . . n/2.

FIGS. 1-1.2 illustrate the system. There is a great deal of symmetry in the system so as to be subject to implementation in VLSI or other integrated circuit techniques.

The sort is carried out in two major steps, input and output. These steps are overlapped with the input and output operations typical of sort instructions in computers. In the usual such operation, in which the input and output steps are required anyway, a portion of the sorting operation takes place during the input step, so as to result in an input semi-sort sequence. At a subsequent time, when the output step is performed, the input semi-sort sequence is subjected to the output semi-sort so as to result in sorted output.

FIGS. 1.1-1.2 in composite show a cross section of the required matrix which has a column for tag bits, a column for bits 1, and additional columns for additional bits up to maximum bit order position "bit w." The matrix array also includes rows 1 to n/2, with associated shift register positions for each row.

This sorter not only processes the items of a given sequence in a pipelined fashion, but also sorts different sequences in a pipelined way, i.e., while one sorted sequence is being output, a new sequence may be input at the same time from the other end of the sorter. This way, the I/O time of the sequence is completely absorbed by the sorting time needed by another.

FIG. 1 is a simplified depiction of the sorter array presented for discussion of operation. In operation, during the input semi-sort operation, item pairs are introduced into cell 1 (cell n/2 during operations from the other end of the array) and internally compared. The item entering the array is individually compared with the item remaining in the entry cell, and the item entering the next cell is individually compared to the item remaining in that cell, and so forth. Assuming the sort is an ascending sort, the larger of the item presented and the item remaining is passed forward to the next cell. At the end of the input step, the items are arranged in a somewhat ordered fashion, with larger items distributed toward the end cell and smaller items distributed toward the entry cell, but with a total distribution far from ordered. During the input semi-sort, the larger items of each item comparison are forwarded, and the larger items are therefore drifting toward the end cell, but some large items remain near the entry cell.

FIG. 1 is a block diagram of the Dual Reciprocating Pipelined Sorter. The first two cells (cells 1+2) and the last cell (cell n/2) are shown.

Cell 1 is capable of receiving two items, comparing the two items, and selectively transferring one or the other of the two items to Cell 2 or out.

Cells 2. . . n/2 are similar to cell 1, each capable of comparing the two items it may be storing and of transferring selectively one or the other of the items and replacing the transferred item with an item transferred from an adjacent cell or from outside the sorter.

In operation, the sorter stack of n/2 cells is controlled to accept an unordered group of items in series presentation. These items trickle into the sorter stack according to the sort criteria, which for purposes of discussion may be considered low-to-high, or ascending. As soon as an item has been entered into Cell 1, it is compared to the (infinity) content of Cell 1, and found to be $\leq$ the item stored in the other side of Cell 1. On the next cycle, the larger of the two numbers trickles down, and another item is entered into Cell 1 for comparison. The larger item trickles downward, cycle by cycle as the items are presented, until all the items have been presented. At this point the semi-sort has been accomplished, with most of the larger numbers having trickled down into the sorter stack in the appropriate sequence, but possibly with several of the later-presented items still having high values. The second semi-sort is then carried out, with the smaller numbers trickling upward and out of the sorter stack, cycle by cycle. The group of items exit from Cell 1 in ordered sequence.

During the second semi-sort, as items exit from Cell 1, an entirely unrelated unordered sequence may be presented at the other end of the sorter stack at Cell n/2, and may be trickling upward in response to appropriate control signals and the related comparisons.

FIGS. 1.1 and 1.2 in composite illustrate the dual reciprocating sorter in a representative array. In each (row) cell (1, 2...n/2−1, n/2) there is a control mechanism controlling each of the several bit positions. The row of bit positions in the cell are assigned bit values "tag", 1...w, one position for each bit value. Each cell includes a first item register A, a second item register B, and a comparator.

The Bit 1 position of cell 1, for example, comprises an A bit register position 11, a B bit register position 12, and a bit position comparator 13, together with interconnections for data and control signals.

An item comprising a tag bit and a number of data bits may be previously stored in Item Register A for row 1.

A second item similarly comprising a tag bit and a number of data bits may be entered into Item Register B for row 1. A comparison of stored values in Item Register A and Item Register B is made by the cell 1 comparator (Bit 1 position comparator 13 and other comparators in Row 1) and the result is provided to Control Row 1 mechanism 14.

Shift register 15 is used to tally the penetration depth of the items trickling downward (or upward) in the sorter stack.

Control signals Opt, Phase 1, Phase 2, Phase 3, I and $\bar{I}$ are clocking signals for the row control mechanisms (14 for Control Row 1).

FIGS. 2.1 and 2.2 illustrate an example of the sorting of a sequence in ascending order; "∞" represents the largest item possible. At the input stage the larger of the two items in each cell is transferred down, while at the output stage the smaller of the two is transferred up. Note that at the end of the input semi-sort (step 6), the smallest item must be in the top cell, the second smallest item must be in either the top or the second cell. In general, the i-th smallest item must be in one of the top i cells. This is why the output sequence is sorted.

The same principle applies to a descending sort; we have only to replace "∞" by "$\infty$", the smallest item and interchange "larger" with "smaller". (It will be shown later that it is not necessary to flood the sorter initially with either "∞" or "$\infty$". See FIG. 14.1-14.5.

Let A,B be the two items stored in a cell. Let M=Max(A,B), m=min(A,B). If we consider the sorting of an isolated sequence, and the group of items is input and output through the top (top sequence), the specific action in the transfer phase can be summarized as follows:

TABLE 1

| Sort Order | Stage Input (Down) | Output (Up) |
|---|---|---|
| Ascending | M moves down to next cell (M ↓) | m moves up to next cell (m ↑) |
| Descending | m moves down to next cell (m ↓) | M moves up to next cell (M ↑) |

If the group of items is input and output through the bottom port of the sorter (bottom sequence), the table would be:

TABLE 2

| Sort Order | Stage Input (Up) | Output (Down) |
|---|---|---|
| Ascending | M ↑ | m ↓ |
| Descending | m ↑ | M ↓ |

A fact to be noted is that the roles of M and m are interchanged when we consider a descending as opposed to ascending sort.

When we overlap the output of a group of items with the input of another, it is clear from Tables 1 and 2 that the transfer actions are different for the two groups. For example, for an ascending sort, in the upward movement, we have m ↑ for the output (top) sequence and M ↑ for the input (bottom) sequence.

For this distinction, we attach a tag to each item when it is input: "0" ("1") to items in top (bottom) sequence. This tag will be considered part of the item, in the comparison as well as in the transfer. And we obtain the table on transfer actions as follows:

TABLE 3

| Data Movement | Tag bits | | | | | |
|---|---|---|---|---|---|---|
| | 0 | 0 | 1 | 1 | 0 | 1 |
| Downward | M ↓ | (m ↓) | m ↓ | (M ↓) | M ↓ | (M ↓) |
| Upward | m ↑ | (M ↑) | M ↑ | (m ↑) | m ↑ | (m ↑) |

The parenthized entries correspond to descending sort. The third column represents the frontier cell between the two sequences. If we include the tag bit as the most significant bit of the items for purposes of comparison, the item from a bottom sequence with tag bit =1 will be always larger than the item from the top sequence with tag bit =0. Since we compare M (m) during the downward phase and m (M) during the upward phase the two sequences will be always kept separate. An example of sorting with the added tag bits is shown in FIGS. 3.1 and 3.2.

LOGIC DESIGN

Throughout this patent specification, the cell array of the sorter will be represented vertically. Each cell, containing two w-bit items, is a horizontal linear array (row) of w dibit-cells. The overall topological layout is shown in FIG. 4. In actual physical layout, a carpenter rule folding of the cell array might be needed to obtain a more square-shaped chip.

Dibit-cell.

Figure 5:
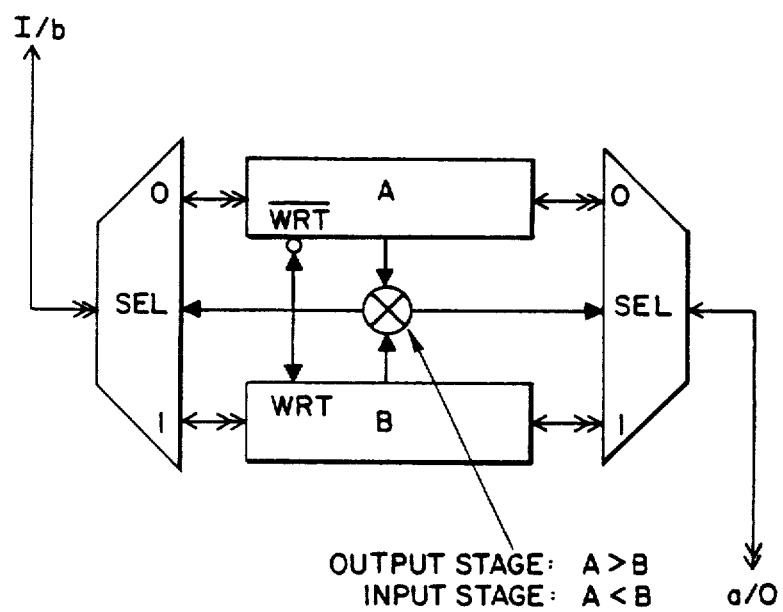
FIG. 5 is a block diagram of a dibit cell.

Each such cell is a compare/steer unit for two bits, one from each of the two items A and B, representing the same bit position. FIG. 5 is the block diagram of a dibit-cell. In downward (upward) movements, after comparison, one of the two bits will be shifted out on line a(b) to the next (previous) cell, while a bit from the previous (next) cell is being shifted in on line I (O). In FIG. 5, the terms "input" and "output" refer to a top sequence, and the controls are indicated for an ascending sort.

Figure 6:
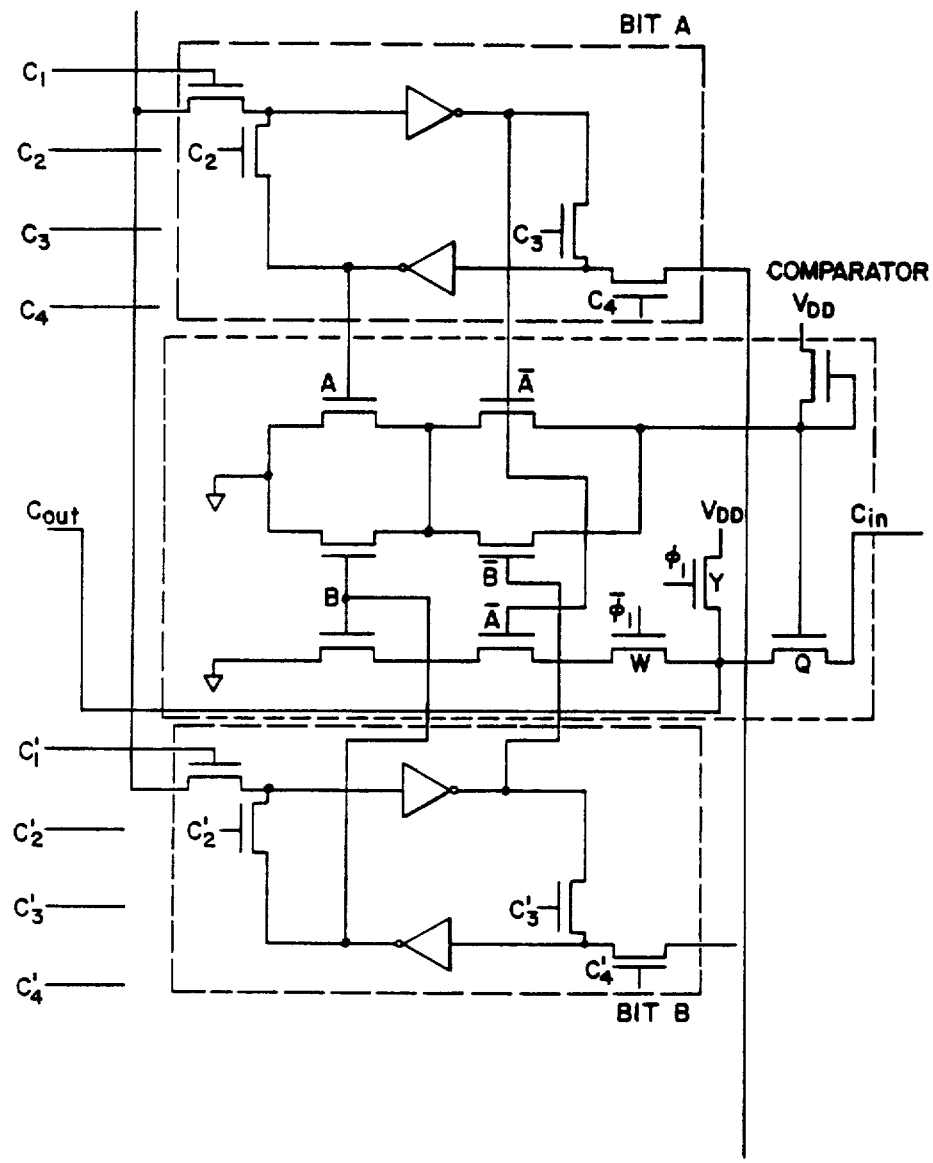
FIG. 6 is a circuit schematic of a dibit cell.

A circuit schematic of a dibit-cell is shown in FIG. 6. The precharged carry-propagate-type comparator is shown together with the two bit-cells. It should be noted that every bit-cell of item A (B) in a cell row is controlled by the same four signals, $C_1$, $C_2$, $C_3$ and $C_4$ ($C'_1$, $C'_2$, $C'_3$ and $C'_4$), so that all the bits of an item are recycled or shifted at the same time.

Figure 7:
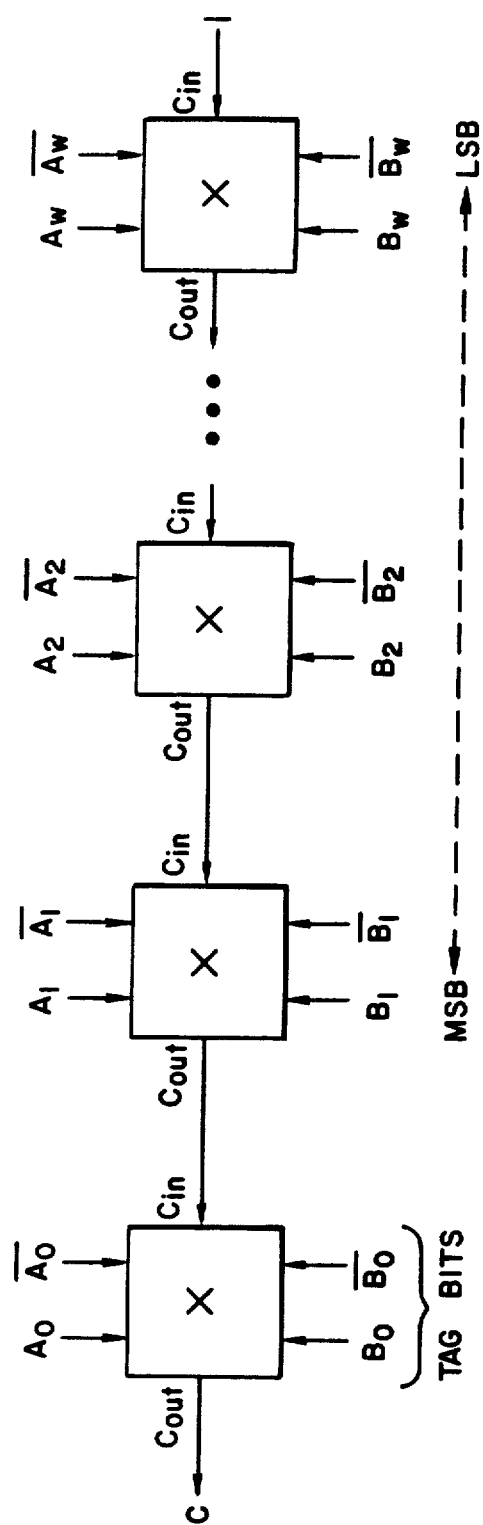
FIG. 7 illustrates chaining of dibit cells in a cell row.

The comparators of the dibit-cells in a cell row are chained as in FIG. 7. C is the comparison result of items A and B, i.e., C=1 if item A ≧ item B, C=0 otherwise. The comparison carry chain is precharged during clock phase $\phi_1$ (gates W and Y in FIG. 6).

Control.

To illustrate, let us consider an ascending sort with a top sequence. Each dibit cell is a 2-inverter loop controlled by four gates using a 2-nonoverlapping-phase clock. The required gatings for different situations with $A \geqq B$ (i.e., comparision result $C=1$) are shown in FIG. 8. In the case of $A < B$, just interchange the gatings for A and B. The boolean expressions obtained are listed as follows:

| | |
|---|---|
| $C_1 = \phi_2 I\bar{a} + \phi_1 \bar{I}a$ | $C'_1 = \phi_2 \bar{I}a + \phi_1 \bar{I}\bar{a}$ |
| $C_2 = \phi_2 I a + I$ | $C'_2 = \phi_2 Ia + \bar{I}$ |
| $C_3 = I + \phi_2 \bar{I}a$ | $C'_3 = I + \phi_2 I a$ |
| $C_1 = \phi_1 Ia + \phi_2 \bar{I}a$ | $C'_4 = \phi_1 I\bar{a} + \phi_2 \bar{I}\bar{a}$ |

$I=1(0)$ indicates the downward (upward) movement; "a" is the boolean variable which takes opposite values (0 and 1) in opposite situations:

ascending (Opt=0) versus descending sort (Opt=1),
top (SR=0) versus bottom sequence (SR=1),
and $A \geqq B$ (comparison carry C=1) versus $A \geqq B$ (C=0).

It follows that a is the exclusive -OR of C, SR and opt, i.e.,

| | SR | |
|---|---|---|
| Opt | 0 | 1 |
| 0 | C | $\bar{C}$ |
| 1 | $\bar{C}$ | C |

Figure 9:
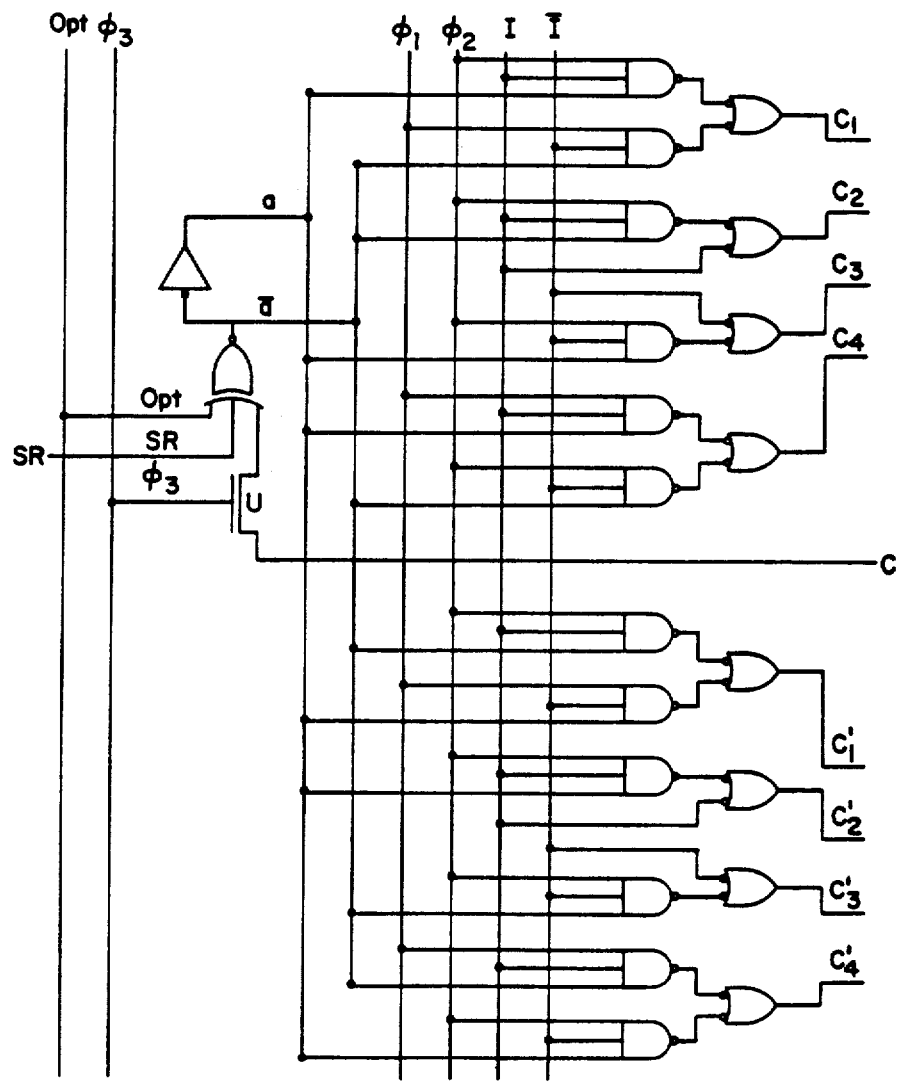
FIG. 9 is a circuit schematic for cell control.

See FIG. 9 for the circuit schematic of the cell control.

Figure 10:
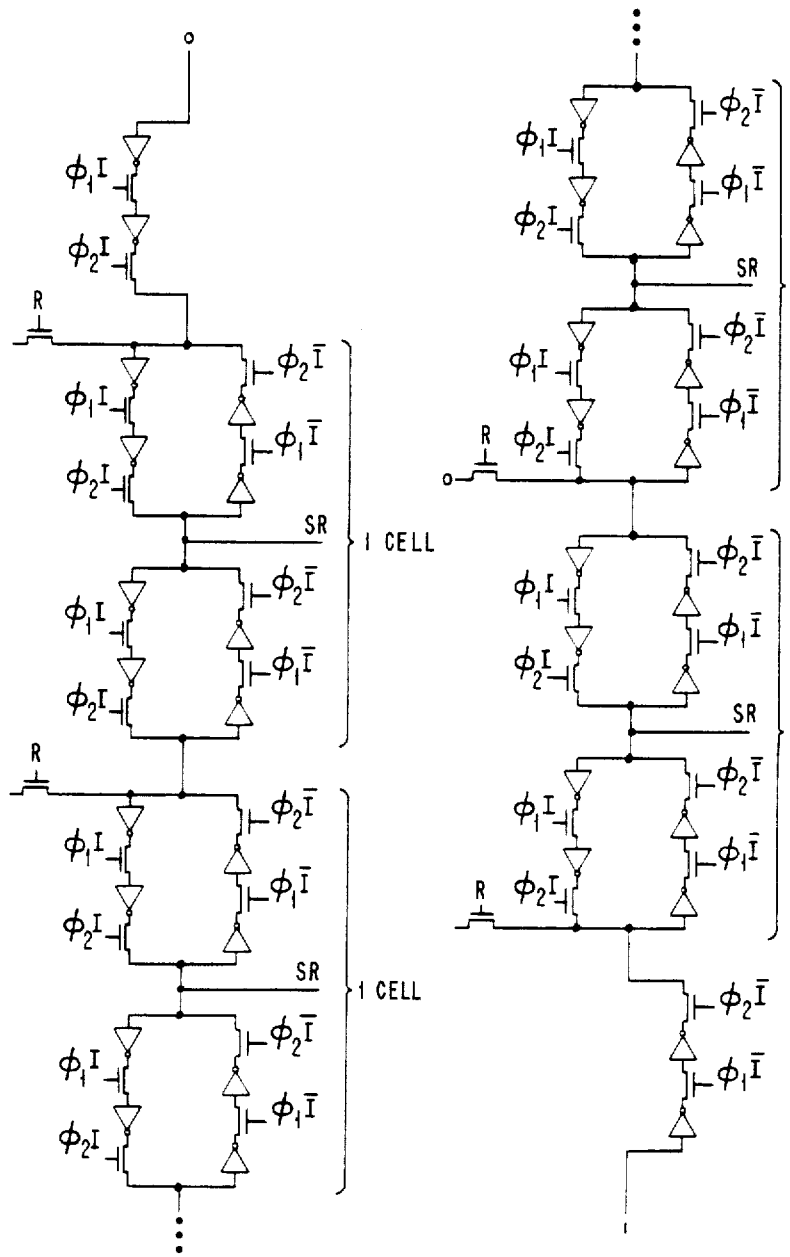
FIG. 10 shows a bidirectional double shift register chain.

To have homogeneous and regular cells, we have avoided the explicit use of the tag bit combination to distinguish top and bottom sequences (Table 3); instead we have a bidirectional double shift-register chain, whose contents move up and down in synchrony with those of the cells and whose output at each level is taken to be SR, as shown in FIG. 10, so that an item of a top (bottom) sequence is always chaperoned by SR=0 (1). A slight complication occurs at the frontier. The desired transfer action table is then:

TABLE 4

| | Ascending | | | Descending | | |
|---|---|---|---|---|---|---|
| Tag-bits | 00 | 11 | 01 | 00 | 11 | 01 |
| Down | M↓ | m↓ | M↓ | m↓ | M↓ | M↓ |
| Up | m↑ | M↑ | m↑ | M↑ | m↑ | m↑ |
| SR | 0 | 1 | 0 | 0 | 1 | 1 |

The reader could easily check out from FIG. 10 that the two extra unidirectional shift registers at the two ends are needed to fulfill the requirement of the third column in both ascending and descending sort.

Timing

Figure 11:
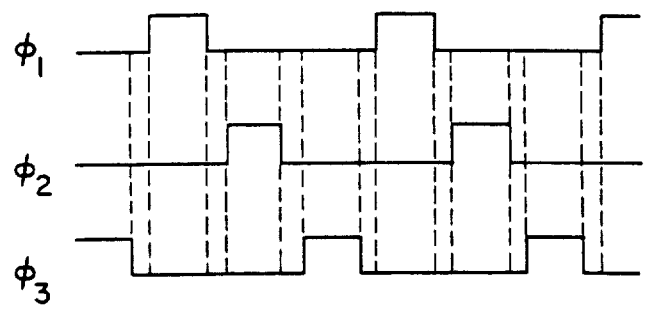
FIG. 11 illustrates the clock timings.
Figure 12:
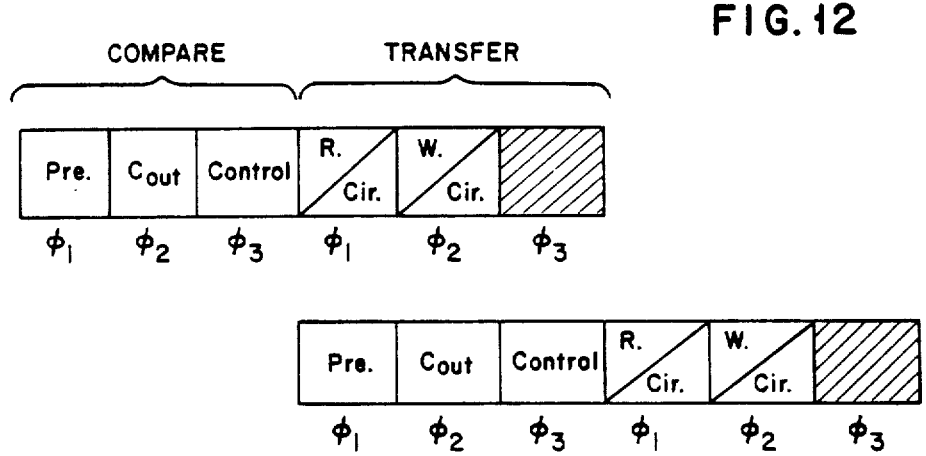
FIG. 12 illustrates the precharging technique for the comparison carry line.

We use a three-nonoverlapping-phase clock as shown in FIG. 11. During phase $\phi_1$, the transfer bit is read out from cell (i) while the other bit is recycled and the comparison carry chain precharged (FIG. 12). During phase $\phi_2$, the transfer bit is written into the next cell (i+1 or i−1) while the other bit is making a full recycle and the comparison taking place. At phase $\phi_3$, the comparison result signal is fed into the control circuit of each cell.

Figure 13:
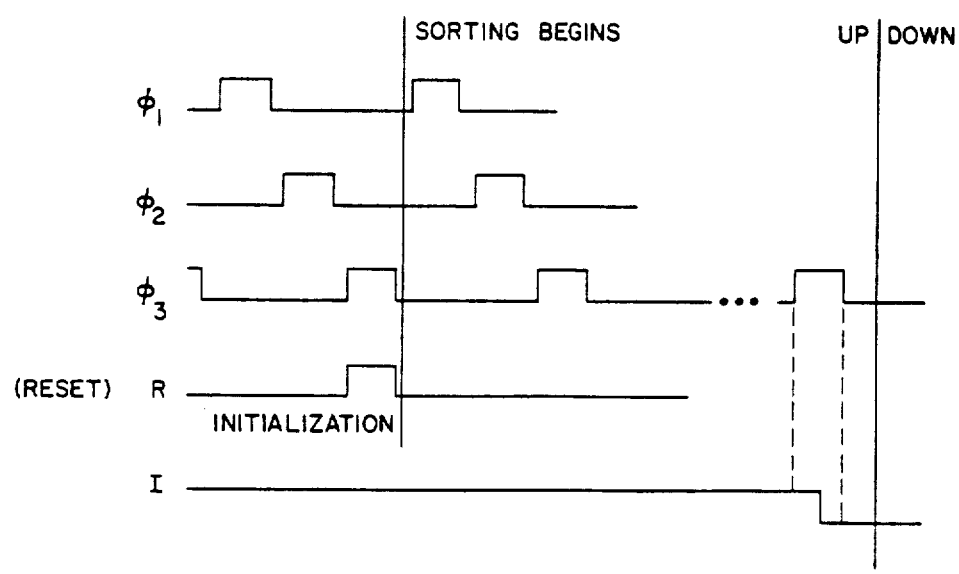
FIG. 13 illustrates sort timings.

In addition, phase $\phi_3$ is needed (see FIG. 13)
(1) for the transition from up to down and down to up stages,
(2) for the initialization,
(3) and to avoid racing condition in the loop of comparator, control, and bit cell.

Initialization

Before the beginning of a sort, instead of initializing all the cells with "∞" or "−∞", it is necessary only to fill in the two border cells with tags distinct from the tags of the sequence coming in, together with appropriate settings of the comparison shift registers as in FIGS. 14.1–14.5. Recall that top (bottom) sequences have tag bit "0"("1"). So here "∞" ("−∞") represents any number with tag bit "1" ("0"). It could be easily checked from Table 4 and e.g. FIG. 14.1–14.5 that these initializations are indeed adequate.

All the initial values are injected into the sorter during clock phase $\phi_3$.

Figure 15:
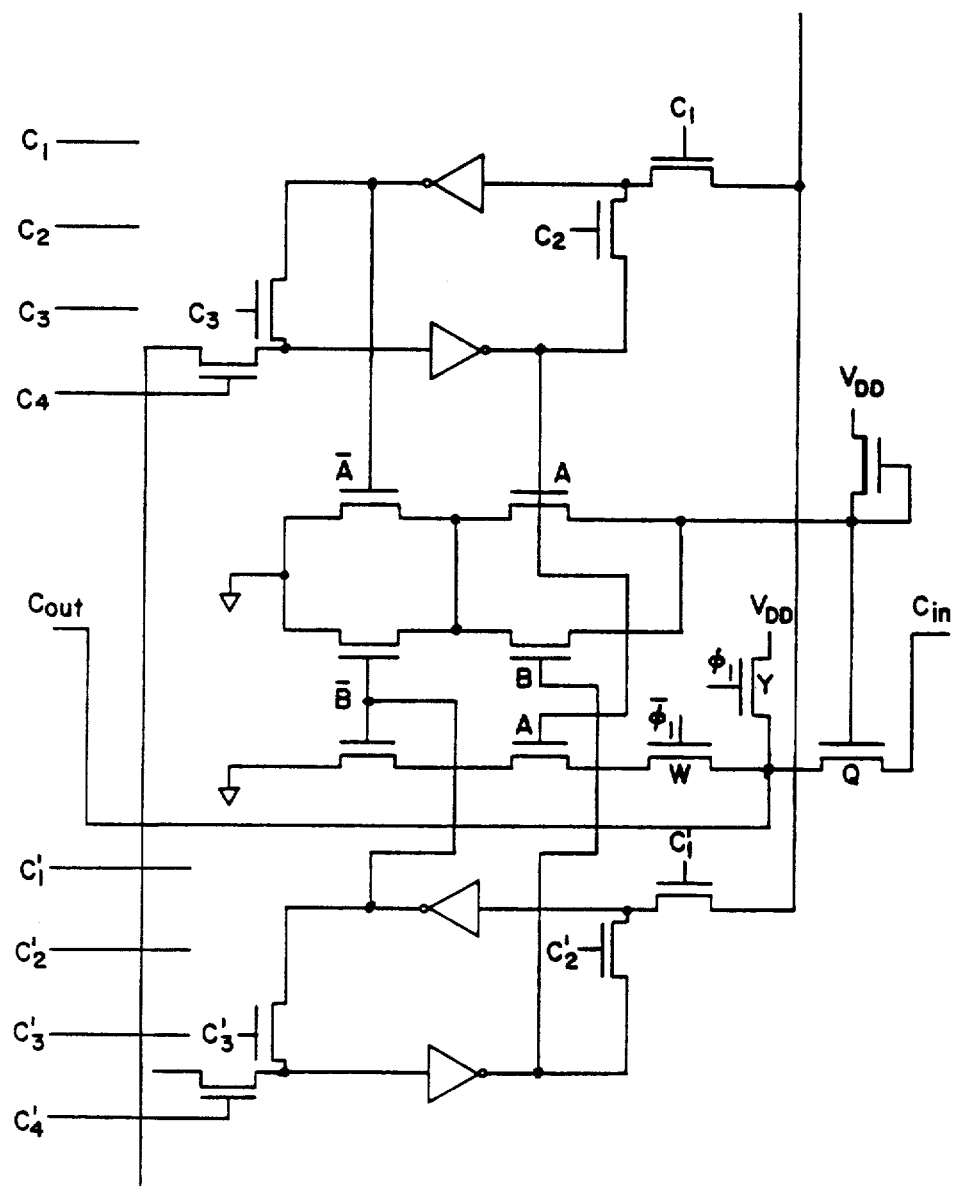
FIG. 15 is a detailed schematic diagram of a dibit cell.

The circuits are drawn up as if the wires connecting dibit-cells of rows i and i+1 have enough capacitance to store the transfer bit. If they do not, it would be a simple matter to add to them connection inverters. Without the inverters, comparisons on adjacent row cells must be implemented differently. Indeed, as can be seen in FIG. 6, a bit leaving a cell is in complemented form than when it was input. Therefore, to produce the same comparison carry output we need to invert the roles of A and $\bar{A}$, and B and $\bar{B}$ as in FIG. 15. In the global block diagram of FIG. 1 the alternation between adjacent rows is clearly indicated. Note also that an even number of rows is recommended so that data are input and output in "true" form. (Otherwise either the top or bottom would be in "false", i.e., negated form.)

For our implementation (FIG. 6) we have a device count of 26 for a dibit-cell, i.e., 13 per bit versus 6 in today's 16K static RAM. So a sorter chip would have very likely a capacity up to 8K bit or 256 32-bit cells, The sorter can be trivially extended to handle key/pointer pair by simply omitting the compare logic on the portion of the storage cell associated with the pointer. (Then it will require only 8 devices per pointer bit).

We can use the sorter to merge two sorted strings by repeatedly passing them through the sorter in an appropriate way. For example, a generalized odd-even merge algorithm can be employed for this purpose.

What is claimed is:

1. Sort mechanism, for stored digital data, having an array of cells in which data bits are stored, each cell having capability to store equivalent bits of each of a plurality of items, and having a comparator for determining the mutual relationship of the plurality of items according to a sort criterion, and gating means related to the comparison and criterion for establishing a semi-sort during data input to the sorter and for establishing a complementary semi-sort during subsequent data output from the sorter characterized by
(a) sorter stack means comprising an array of cells in a double-ended configuration with top and bottom ends, a top entry/exit cell at the top end and a bottom entry/exit cell at the bottom end;
(b) top input/output control means for distributing an unordered first group of items to said top entry/exit cell, one at a time, during a first semi-sort, and subsequently for distributing said first group of items, one at a time, from said top entry/exit cell during a complementary second semi-sort, to accomplish full sorting of the first group of items; and
(c) bottom input/output control means for distributing an unordered second group of items to said bottom entry/exit cell, one at a time, during a first semi-sort of the unordered second group of items and subsequently for distributing said second group of items, one at a time, from said bottom entry/exit cell during a complementary second semi-sort, to accomplish full sorting of said second group of items.

2. Sort mechanism according to claim 1, further characterized by means controlling said top input/output control means and said bottom input/output control means for simultaneous complementary operation.

3. Sort mechanism according to claim 2, further characterized by first sequence/second sequence tag means, integral with said sorter stack means, for providing a first physical representation in a given cell that the item stored in the cell is of the first group; and for providing a second physical representation that the item stored within the cell is of the second group.

4. Sort mechanism according to claim 3, further characterized by
 transfer control means comprising a bidirectional shift register chain having a position respectively connected to each cell of the sorter stack, having a top extra position at the top end of said sorter stack, and a bottom extra position at the bottom end of said sorter stack;
 means to shift a physical indication from/to said top extra position in the shift register chain synchronously with entry and exit of the first unordered group of items to chaperone the items of the first unordered sequence within said sorter stack; and
 means to shift a physical indication from/to said bottom extra position in the shift register chain synchronously with entry and exit of the second unordered group of items to chaperone the items of the second unordered sequence within said sorter stack.

5. Sort mechanism according to claim 3, further characterized in that said sorter stack comprises, for each cell, a number of dibit cells, one for each bit position, each including:

(1) a first item bit register for storing a bit $A/\overline{A}$ from a first item A;
(2) a second item bit register for storing a bit $B/\overline{B}$ from a second item B;
(3) a comparator operatively connected to said first item register and to said second item register;
(4) gating means operatively connecting said first item register and said second item register to said comparator and to preceding and succeeding cells of said sorter stack; and
(5) gating control means responsive to the result of comparison of the content of said first item register and of said second item register and sort criteria to control gating of the content $A/\overline{A}$ of said first item bit register or the content of said second item bit register $B/\overline{B}$ to the succeeding cell during a first semi-sort sequence and to the preceding cell during a second semi-sort sequence.

6. Sort mechanism according to claim 5, further characterized in that
 said first item register includes first, second, third and fourth transfer gates $C_1$, $C_2$, $C_3$ and $C_4$, connected as a bit register;
 said second item register includes first, second, third and fourth transfer gates $C'_1$, $C'_2$, $C'_3$ and $C'_4$, connected as a bit register
 said comparator includes six comparison transfer gates A, $\overline{A}$, B, $\overline{B}$, B, A and four comparison output transfer gates arranged to accept a carry in signal $C_{in}$ from a lower bit position and to provide selectively a carry out signal $C_{out}$ indicative of the comparison result.

7. Sort mechanism according to claim 4 further characterized in that said sorter stack comprises, for each cell, a number of dibit cells, one of each bit position plus a tag position as a highest order position.

8. Sort mechanism according to claim 7, further characterized in that said transfer control means comprises a shift register having, for each cell, means to store a "1" bit or a "0" bit indicative of the current transfer mode.

* * * * *